Aug. 18, 1931.  H. H. BURDETT  1,819,540
SELVAGE TRIMMING MECHANISM
Filed Feb. 13, 1929
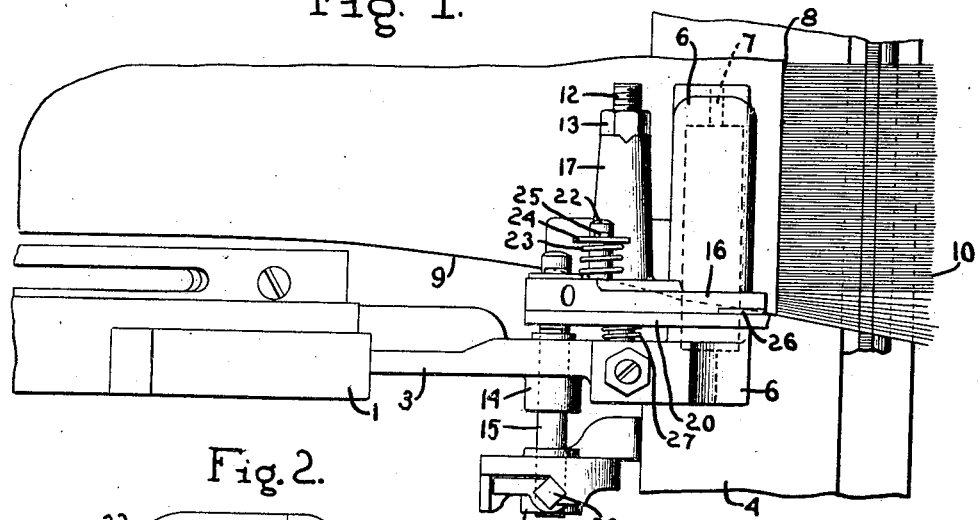
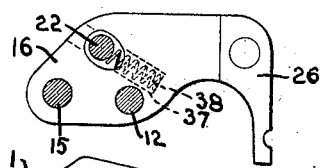
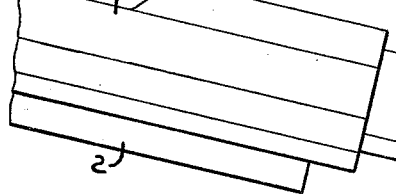
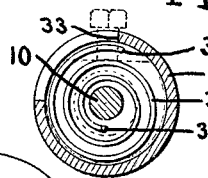
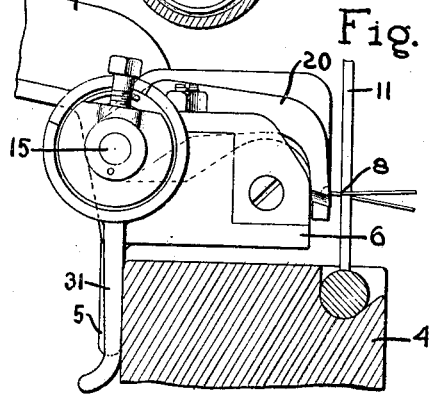
Inventor
Horace H. Burdett
by Heard Smith & Tennant.
Attys.

Patented Aug. 18, 1931

1,819,540

UNITED STATES PATENT OFFICE

HORACE H. BURDETT, OF HOPEDALE, MASSACHUSETTS, ASSIGNOR TO DRAPER CORPORATION, OF HOPEDALE, MASSACHUSETTS, A CORPORATION OF MAINE

SELVAGE TRIMMING MECHANISM

Application filed February 13, 1929. Serial No. 339,694.

This invention relates to a mechanism for trimming off close to the selvage the filling ends left projecting therefrom during the weaving operation. Such ends occur particularly as a result of the operation of the automatic filling replenishing loom wherein each time the filling is changed or replenished, both the discharged filling carrier and the fresh filling carrier leave ends projecting at the selvage which must be removed.

In my Patent No. 1,770,366, granted July 8, 1930, there is disclosed a mechanism for this purpose in which the filling cutting mechanism has its field of action located immediately forward of the fell and close up to the selvage, thus enabling the filling ends extending from the selvage to be severed close to the selvage. In the preferred construction illustrated, this result is secured by a filling cutting mechanism, the effective portions of which are located in the rear of the usual temple and between the ends of the path of the temple roll so that with the cloth held by the temple roll and with the selvage of the cloth thus passing between the ends of the temple roll, the filling cutting mechanism acts close up to the selvage. Furthermore, as disclosed in said patent, the filling cutting mechanism may be yieldingly pressed against the selvage or may be adjusted to stand close to the selvage. When a filling cutting mechanism is thus located close to the selvage immediately forward of the fell, there is danger under certain weaving conditions that the selvage warps pressed outwardly by the reed on the beat-up may be held in the field of action of the cutting mechanism and be severed, thus injuring the cloth.

It is the object of the present invention to provide a filling cutting mechanism of the general type referred to, that is, one acting close to the selvage forward of the fell in which the cutting operation will take place before the reed has approached sufficiently near the fell on the beat-up to force any of the selvage warps into the field of action of the cutting mechanism.

It is the further object of the invention to provide such a filling severing mechanism comprising a fixed cutter blade and a movable cutter blade operating close to the selvage forward of the fell in which the movable blade is provided with an operating arm yieldingly connected thereto and extending in the path of the lay so that this arm is acted on by the lay upon the beat-up to move the movable blade into cooperation with the fixed blade well before the reed engages the fell and in which the operating arm then yields with respect to the movable blade during the completion of the beat-up of the lay, thus causing the severing action to take place before any selvage warps can be forced by the reed into the field of action of the severing mechanism.

These and other objects and features of the invention will appear more fully from the accompanying description and drawings and will be particularly pointed out in the claims.

As the invention is applicable to all types of looms and is concerned only with the severing of the filling ends at the selvage, it is only necessary here to illustrate and describe a preferred form of the invention and those parts immediately associated therewith. While in its broader aspect the mechanism may be carried by any suitable support, it is in the preferred form supported from the shank or head of an ordinary temple and while the cutting mechanism may be operated by any suitable means, it is here illustrated as operated by the lay of the loom on the beat-up as in the case of the cutting mechanism usually embodied in a thread cutting temple.

In the drawings:

Fig. 1 is a top plan view of an ordinary type of loom temple with a preferred form of the invention supported thereby and shown in position in relation to a piece of cloth being woven in a loom.

Fig. 2 is a deail looking toward the surface of the fixed cutter blade.

Fig. 3 is a side elevation of the construction shown in Fig. 1.

Fig. 4 is a detail in cross section on the line 4—4 of Fig. 6 of the hub of the operating arm.

Fig. 5 is a view similar to Fig. 3 showing the parts in the position upon the conclusion of the beat-up.

Fig. 6 is a detail chiefly in vertical cross section taken on the line 6—6 of Fig. 3.

While, as already noted, a mechanism of this invention may be mounted on any suitable support, it is convenient to utilize the head or shank of an ordinary temple for that purpose and the invention in some of its features involves the combination with a temple. Such a temple is illustrated having the usual stand 1 mounted on a bracket 2 connected to and supported by some portion of the loom frame such as the breast beam. This stand extends rearward adjacent the edge of the cloth being woven. The shank 3 of the temple is mounted to slide in the stand being pressed rearward by a spring, not shown, in the stand and moved forward slightly upon the beat-up by the lay 4 striking against a heel 5 depending from the stand. At its rearward end the shank is formed into or supports the transversely extending head 6 in which is journalled the usual temple roll 7, shown in dotted lines in Fig. 1, and which acts to maintain the width of the cloth as it is woven. The temple head embraces the cloth directly forward of the fell 8 and straddles the selvage 9 of the cloth.

The warps 10 extend from the fell rearward through the usual reed 11 carried by the lay and the reed upon the beat-up drives the filling into the fell.

In the preferred construction illustrated, the head 6 of the temple which forms the support for the filling cutting mechanism has mounted therein a rod 12 extending laterally just forward of the head and above the plane of the cloth. This rod at its outer end is threaded and provided with a nut 13. Forward of this rod the head or shank of the temple is formed with a hub 14 and in this hub a shaft 15 extending parallel with the rod 12 is mounted to slide and rotate.

The cutting mechanism comprises a pair of cooperating cutter blades which operate in a plane substantially normal to the path of the cloth and which at their effective portions stand substantially parallel to the selvage forward of the fell. In the preferred construction illustrated, one of these blades is a relatively fixed blade and the other a relatively movable blade, while the two blades together also have a bodily lateral movement or adjustment to enable their effective portions to be positioned and maintained close to the selvage.

The fixed cutter blade member is shown as a metal plate 16 recessed at its bottom edge to fit over the temple head. This plate is maintained in fixed position by a long hub 17 extending laterally therefrom and mounted to slide on the rod 12 and also by an aperture at its forward end of the plate fitting over the shaft 15. At its rear end the plate 16 is formed into a narrow vertical finger 18 adapted to rest against the edge 9 of the cloth and presents a notch 19 in the plane of the cloth to receive the filling end as the cloth advances in the weaving operation. The cutting edge of the fixed blade 16 is presented by the edge of this notch 19.

The movable cutter blade 20 is shown as of generally hook shape also fitting over the temple head in general parallelism with the fixed blade. Its extreme rear end is bevelled off to present a cutting edge to cooperate with the cutting edge 19 of the notch in the fixed cutter blade. This movable blade 20 is shown as pivotally mounted in the temple head, being for that purpose rigidly secured at its forward end to the shaft 15. The movable blade is held in close contact with the fixed blade preferably by means of a stud 22 secured in the movable blade 20 and projecting through a slot in the blade 16. A coiled spring 23 is seated on the stud 22 and extends between the fixed blade 16 and a washer 24 held on the stud by a cotter pin 25.

The movable cutter blade is preferably made of steel and a steel insert 26 may be provided in the fixed blade 16 to present the effective cutting edge.

The entire cutting mechanism comprising the two cooperating blades is positionable to locate the blades close up against the selvage forward of the fell. In the construction illustrated, the hub 17 of the fixed blade abuts the nut 13 and by adjusting this nut, the entire cutting mechanism may be shifted toward or from the selvage. Preferably a coiled spring 27 is seated on the rod 12 between the temple head and the movable blade 20 and acts to hold the cutting mechanism up against the nut 13. This spring is preferably of a light character and may be arranged so that it will press the cutting mechanism to maintain the finger 16 against the selvage 9. In such case the nut 13 acts simply as a stop to limit inward movement. The latter operation is assisted by the shock and jar of the loom, thus enabling the cutter mechanism to be maintained against the selvage and to shift laterally with any change in the path of the selvage.

The operation of the cutting mechanism is effected by a rearward extending arm yieldingly connected to the movable blade. This arm is preferably operated by the lay on the beat-up. During the first portion of the forward movement of the arm, the rear end of the movable blade swings downward past the cutting edge 19, severing any filling end which passes through the notch, and then upon any continued forward movement of the arm, the connection between the arm and blade yields. Thus the cutting action takes place at a relatively early period of the beat-up and long before the reed reaches the fell, so that there is no danger of the selvage warps being brought into the field of action of the cutting mechanism.

In the preferred construction illustrated, the outer end of the shaft 15 is provided with a collar 28 adjustably secured thereto by the set screw 29. The operating arm comprises a cup-shaped hub 30 journalled on the shaft with a radially extending arm portion 31. A portion of the rim 32 of the hub is cut away to form a shoulder 33 at the rear of the set screw 29. A spiral spring 34 is seated in the cup-shaped hub 30 between it and the collar 28, its outer end 35 being secured to the hub and its inner end 36 being secured in the collar.

The movement of the movable blade 20 is limited in each direction by the engagement of the stud 22 with an end of the slot 37 formed in the fixed blade 16. A coiled spring 38 is seated in a bore in the blade 16 and abuts the under side of the stud 22 and thus acts normally to maintain the movable blade 20 in its upper position shown in Fig. 3.

The parts of the construction illustrated normally stand as shown in Fig. 3, the movable blade 20 being held by the spring 38 in its upper position and the arm 31 being held in its rearward position by the spring 34 holding the shoulder 33 against the set screw 29. The lay is shown as the actuating device. The arm 31 is arranged to stand in such a position as to be engaged by the lay 4 when the reed is at a considerable distance from the fell. As beat-up continues, the arm 31 is swung forward by the lay and, as the spring 34 is under tension and presents a much stronger force than the springs 38 and 23 which retard the movement of the movable cutter member, the arm, the shaft 15 and the movable cutter blade 20 move clockwise, viewing Fig. 3, until the stud 22 engages the bottom of the slot 37. During this movement the cutting edge 21 passes the notch edge, severing any filling end which extends through the notch 19 close to the selvage and while the reed is still sufficiently far away from the field of action of the cutting mechanism to prevent any of the selvage warps being diverted into the field of action of the cutting mechanism. As the beat-up of the lay continues, the cutter member 20, shaft 15, hub 30 and set screw 29 being held against further rotation clockwise, the arm 31 moves with respect to the shaft carrying the shoulder 33 away from the set screw 29 and winding the coil spring 34, and this movement continues until the lay engages the heel 5 of the temple. Thus a short, quick movement of the movable cutter blade is given when the reed is still at a relatively long distance from the fell and thereafter the connection between the operating arm and the movable cutter member yields to permit the concluding movement of the lay or device for actuating the cutting mechanism.

The parts at the conclusion of the beat-up are as shown in Fig. 5, with the reed against the fell and the lay in engagement with the heel 5 of the temple and the arm 31. As the lay retracts, the parts move in the opposite direction, being forced as a unit counter-clockwise by the spring 38 until the stud 22 engages the upper end of the slot 27, when thereafter the arm 31 moves with respect to the shaft 15 under the tension of the spring 34 until the shoulder 33 again engages the set screw 29.

Thus all filling ends are severed accurately and surely close to the selvage and without any danger of cutting the selvage warps. After a filling is beaten in, if an end is left extending from the selvage, it will be carried into the field of action of the cutting mechanism, as into the notch in the fixed blade, and on the next beat-up thereafter will be severed close to the selvage.

The yielding connection between the operating arm and the movable cutter blade is preferably as shown so arranged that the entire cutting mechanism may readily be located quite independently of the cloth engaging elements of the temple, such as the roll 7, and so as to present the field of action of the cutting mechanism close to the selvage, whatever may be the path of the selvage through the temple and whatever may be the variation in the path of the selvage through the temple.

Having thus described the invention, what is claimed as new, and desired to be secured by Letters Patent, is:

1. Selvage trimming mechanism for looms having a reed for beating in the filling, comprising a pair of cooperating cutter blades mounted and operating in a plane substantially normal to the path of the cloth the said blades having their cutting field close to the selvage forward of and adjacent the fell and means acting to effect the cutting movement of said blades before the reed has advanced sufficiently on the beat-up to divert a selvage warp into the field of action of said blades.

2. Selvage trimming mechanism for looms having a lay and a reed for beating in the filling, comprising a pair of cooperating cutter blades mounted and operating in a plane substantially normal to the path of the cloth the said blades having their cutting field close to the selvage forward of and adjacent the fell and yielding means engaged by the lay acting to effect the cutting movement of said blades before the reed has advanced sufficiently on the beat-up to divert a selvage warp into the field of action of said blades and yielding thereafter to prevent further actuation of the cutter blades during the completion of the beat-up.

3. Selvage trimming mechanism having the construction defined in claim 1, together with means for adjusting the cutter blades bodily toward and from the selvage of the cloth.

4. Selvage trimming mechanism for looms having a reed for beating in the filling comprising a support mounted on the loom frame and extending in the vicinity of the selvage forward of the fell, a pair of cooperating cutter blades operating in a plane substantially normal to the path of the cloth and substantially parallel to the selvage forward of the fell, means for mounting the cutter blades on the support for joint bodily movement toward and from the selvage whereby the blades may be positioned to sever close to the selvage filling ends extending therefrom, and means acting to effect the cutting movement of said blades before the reed has advanced sufficiently on the beat-up to divert a selvaged warp into the field of action of said blades.

5. Selvage trimming mechanism for looms having a lay and a reed for beating in the filling comprising a support mounted on the loom frame and extending in the vicinity of the selvage forward of the fell, a pair of cooperating cutter blades operating in a plane substantially normal to the path of the cloth and substantially parallel to the selvage forward of the fell, means for mounting the cutter blades on the support for joint bodily movement toward and from the selvage whereby the blades may be positioned to sever close to the selvage filling ends extending therefrom, and yielding means engaged by the lay acting to effect the cutting movement of said blades before the reed has advanced sufficiently on the beat-up to divert a selvage warp into the field of action of said blades and yielding thereafter to prevent actuation of the cutter blades during the completion of the beat-up.

6. Selvage trimming mechanism for looms having a temple, a lay and a reed comprising a fixed blade having a cutting edge in the rear of the temple, a movable blade extending to the rear of the temple and having a cutting edge cooperating with that of the fixed blade, and an arm yieldingly connected to the movable blade extending into the path of the lay and acting as the lay beats up to move the movable blade into cooperation with the fixed blade before the reed has advanced sufficiently on the beat-up to divert a selvage warp into the field of action of said blades, the said arm thereafter yielding with respect to the movable blade during the completion of the beat-up of the lay, whereby danger of cutting the selvage warps held out by the reed on the beat-up is prevented.

7. Selvage trimming mechanism for looms having a temple comprising a fixed blade having a cutting edge in the rear of the temple, a movable blade extending to the rear of the temple and having a cutting edge cooperating with that of the fixed blade, and an arm yieldingly connected to the movable blade and extending rearward so that, when the arm is pushed forward, it will first move the movable blade into cooperation with the fixed blade and thereafter have an extended movement with respect to and without moving the movable blade.

8. Selvage trimming mechanism for looms having a temple comprising a fixed blade having a cutting edge in the rear of the temple, a blade pivotally mounted on the temple and extending to the rear of the temple and having a cutting edge brought into and out of cooperation with that of the fixed blade by pivotal movement, an arm mounted to pivot on the pivotal axis of the movable blade and extending rearward, and a yielding connection between the arm and the pivoted blade, the said arm acting when it is pushed forward first through the yielding connection to swing the pivoted blade into cooperation with the fixed blade and thereafter to swing with respect to the pivoted blade without further movement of the pivoted blade.

9. Selvage trimming mechanism for looms having a temple, a lay and a reed comprising a fixed blade having a cutting edge in the rear of the temple, a shaft journalled in the temple parallel with the fell, a cutter blade secured to the shaft and projecting rearward of the temple and presenting a cutting edge cooperating with that of the fixed blade, an arm journalled on the shaft and extending rearward into the path of the lay, means acting normally to maintain the movable cutter blade raised, a spring interposed between the arm and the shaft acting to swing the arm rearward and to permit it to yield forward with respect to the shaft, and cooperating stops on the shaft and arm limiting the rearward movement of the arm with respect to the shaft, the lay acting upon the beat-up to engage the arm and rock the shaft to move the cutter blade carried thereby to effect cutting cooperation of the fixed blade before the lay has advanced sufficiently to cause the reed to divert a selvage warp into the field of action of said blades and the lay thereafter acting to swing the arm against the tension of the spring with respect to the shaft.

10. A thread cutting loom temple comprising a shank supported from the loom frame, a head on the shank having a temple roll journalled therein, a laterally extending rod mounted in the shank, a bearing in the shank parallel with the rod, a shaft in said bearing, a fixed cutter blade mounted to slide on the rod and connected to the shaft to slide therewith and extending at the rear of and adjacent to the temple head, a movable cutter blade mounted to move laterally with the main cutter blade and held yieldingly thereagainst and connected to the shaft to slide and rock therewith, means acting normally to hold the movable cutter blade in open position, an arm journalled on the shaft and extending rearward into the path of the lay, a spring interposed between the arm and the shaft acting to swing the arm rearward and to permit it to yield forward with respect to the shaft, and cooperating stops on the shaft and arm limiting the rearward movement of the arm with respect to the shaft.

In testimony whereof, I have signed my name to this specification.

HORACE H. BURDETT.